(12) United States Patent
Bittmann et al.

(10) Patent No.: US 9,973,789 B1
(45) Date of Patent: May 15, 2018

(54) QUANTIFYING BRAND VISUAL IMPACT IN DIGITAL MEDIA

(71) Applicant: SAP SE, Walldorf (DE)

(72) Inventors: Ran Bittmann, Tel Aviv (IL); Michael Kemelmakher, Hod Hasharon (IL); Yuri Arshavski, Netanya (IL)

(73) Assignee: SAP SE, Walldorf (DE)

( * ) Notice: Subject to any disclaimer, the term of this patent is extended or adjusted under 35 U.S.C. 154(b) by 0 days. days.

(21) Appl. No.: 15/602,747

(22) Filed: May 23, 2017

(51) Int. Cl.
*H04N 21/234* (2011.01)
*H04N 21/81* (2011.01)
*G06K 9/00* (2006.01)

(52) U.S. Cl.
CPC ... *H04N 21/23418* (2013.01); *G06K 9/00718* (2013.01); *H04N 21/812* (2013.01)

(58) Field of Classification Search
CPC .............................................. H04N 21/23418
See application file for complete search history.

(56) References Cited

U.S. PATENT DOCUMENTS

| | | | |
|---|---|---|---|
| 5,724,573 A | 3/1998 | Agrawal et al. | |
| 6,094,645 A | 7/2000 | Aggarwal et al. | |
| 6,182,070 B1 | 1/2001 | Megiddo et al. | |
| 6,278,997 B1 | 8/2001 | Agrawal et al. | |
| 6,385,608 B1 | 5/2002 | Mitsuishi et al. | |
| 7,680,685 B2 | 3/2010 | Ouimet et al. | |
| 7,685,021 B2 | 3/2010 | Kumar et al. | |
| 7,962,526 B2 | 6/2011 | Li et al. | |
| 8,538,965 B1 | 9/2013 | Talyansky et al. | |
| 2002/0056124 A1* | 5/2002 | Hay | G06K 9/00 725/87 |
| 2003/0217055 A1 | 11/2003 | Lee et al. | |
| 2004/0083206 A1 | 4/2004 | Wu et al. | |
| 2004/0098358 A1 | 5/2004 | Roediger | |
| 2011/0184922 A1 | 7/2011 | Lee | |
| 2012/0130964 A1 | 5/2012 | Yen et al. | |
| 2012/0254242 A1 | 10/2012 | Kanagasabapathi et al. | |
| 2013/0204919 A1 | 8/2013 | Kitazato | |
| 2014/0082648 A1* | 3/2014 | Tanner | G06Q 20/145 725/14 |
| 2016/0179903 A1 | 6/2016 | Bittmann | |
| 2016/0203388 A1* | 7/2016 | Li | G06T 7/73 386/241 |
| 2017/0150211 A1* | 5/2017 | Helferty | H04N 21/44008 |

* cited by examiner

*Primary Examiner* — Pankaj Kumar
*Assistant Examiner* — Charles N Hicks
(74) *Attorney, Agent, or Firm* — Fish & Richardson P.C.

(57) ABSTRACT

Methods, systems, and computer-readable storage media for receiving a set of frames, each frame being provided as a digital image that depicts a portion of an event and a logo associated with a brand, for each frame in the set of frames, and for each pixel in a frame: determining a weight of the pixel based on a distribution assigned to the frame, providing a quality of the logo depicted in the frame, and calculating a pixel quotient based on the weight and the quality, for each frame in the set of frames: determining a frame quotient at least partially based on a sum of all pixel quotients for the frame, and determining an impact indicator for the logo based on a total size of digital media comprising the set of frames and a sum of frame quotients of the frames in the set of frames.

20 Claims, 6 Drawing Sheets

QUANTIFYING BRAND VISUAL IMPACT IN DIGITAL MEDIA

BACKGROUND

Enterprises invest heavily in advertising their brands. In some examples, an enterprise can sponsor broadcast events, during which brand logos may be on displayed. For example, an event (e.g., sporting event) is broadcast on television, and/or over the Internet, and the brands (e.g., logos) appear in the broadcast (e.g., on signs, on player clothing, on vehicle, and other places). Although the enterprise knows at what event and where the brand is shown, the brand may only be intermittently viewable during the event, and at varying degrees of quality (e.g., a logo on a jersey might not always be directly viewable). Consequently, the enterprise is unaware of the quantity and/or quality of the brand representation throughout the event. In some cases, enterprises can conduct a manual audit by reviewing digital media that records the event. This process, however, can be time and resource intensive. For example, resources can be tied up for a significant amount of time, while an auditor views digital media capturing the event to make an evaluation.

SUMMARY

Implementations of the present disclosure include computer-implemented methods for unsupervised aspect extraction from raw data. In some implementations, actions include receiving a set of frames, each frame being provided as a digital image that depicts a portion of an event and a logo associated with a brand, for each frame in the set of frames, and for each pixel in a frame: determining a weight of the pixel based on a distribution assigned to the frame, providing a quality of the logo depicted in the frame, and calculating a pixel quotient based on the weight and the quality, for each frame in the set of frames: determining a frame quotient at least partially based on a sum of all pixel quotients for the frame, and determining an impact indicator for the logo based on a total size of digital media comprising the set of frames and a sum of frame quotients of the frames in the set of frames. Other implementations of this aspect include corresponding systems, apparatus, and computer programs, configured to perform the actions of the methods, encoded on computer storage devices.

These and other implementations can each optionally include one or more of the following features: the frame quotient for at least one frame is further determined based on a bias value applied to the frame quotient, the bias value indicating a relative significance of an occurrence at least partially depicted within the at least one frame; the distribution includes one of a bivariate normal distribution, and a multimodal distribution; a first frame is assigned a bivariate normal distribution, and a second frame is assigned a multimodal distribution; the quality is determined based on one or more of an internal contrast of the logo, and an external contrast of the logo; the total size of digital media is determined based on the number of pixels of all frames that record the event; and actions further include determining a brand impact value based on a plurality of impact indicators, the plurality of impact indicators including the impact indicator for the logo.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to quantifying brand impact from digital media. More particularly, implementations of the present disclosure are directed to processing digital media that records an event to quantify brand impact of one or more brands digitally represented within the digital media. Implementations can include actions of receiving a set of frames, each frame being provided as a digital image that depicts a portion of an event and a logo associated with a brand, for each frame in the set of frames, and for each pixel in a frame: determining a weight of the pixel based on a distribution assigned to the frame, providing a quality of the logo depicted in the frame, and calculating a pixel quotient based on the weight and the quality, for each frame in the set of frames: determining a frame quotient at least partially based on a sum of all pixel quotients for the frame, and determining an impact indicator for the logo based on a total size of digital media comprising the set of frames and a sum of frame quotients of the frames in the set of frames.

Figure 1:
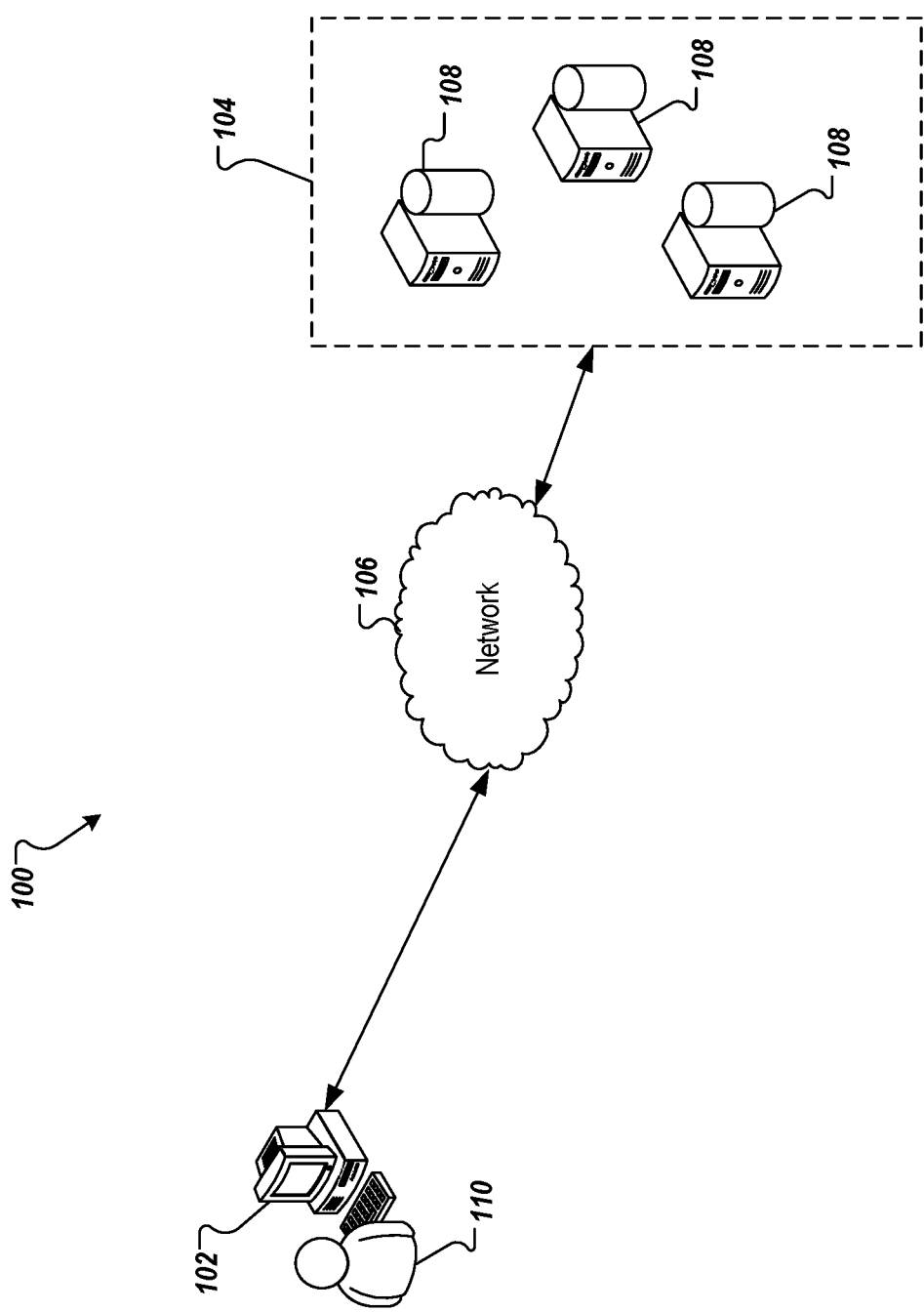
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a brand impact analysis service (e.g., provided as one or more computer-executable programs executed by one or more computing devices). For example, digital media (e.g., one or more digital videos that record one or more events) can be provided to the server system (e.g., from the client device 102, and/or the server system 104), and the server system 104 can process the media digital through the brand impact analysis service to provide result data. For example, the server system 104 can send the result data to the client device 102 over the network 106 for display to the user 110.

Implementations of the present disclosure are described in detail herein with reference to an example context. The example context includes brand impact analysis for a sporting event, during which multiple logos are each intermittently depicted with varying degrees of quality. It is contemplated, however, the implementations of the present disclosure can be used in any appropriate context.

In accordance with implementations of the present disclosure, an impact indicator (I) can be determined for each of one or more brands displayed during an event (e.g., a sporting event). In some examples, a brand can include one or more names, and/or logos. For example, Nike is a brand that includes the name, Nike, as well as the "swoosh" logo, and a combination of the name, Nike, and the "swoosh." As another example, Puma is a brand that includes the name, Puma, as well as the puma (animal) logo, and a combination of the name, Puma, and the puma logo. As another example, Adidas is a brand that includes the name, Adidas, as well as the trefoil logo, and a combination of the name, Adidas, and the trefoil logo.

In some implementations, an event is recorded in digital media. For example, an event can be recorded in one or more digital videos, each digital video including a plurality of frames. In some examples, each frame is provided as a digital image that is stored in computer-readable memory. In some examples, each digital image includes a plurality of pixels. For example, an image that is provided in 1080p resolution has 2,073,600 pixels (i.e., 1,920 horizontal pixels by 1,080 vertical pixels).

In accordance with implementations, a frame set (e.g., $F \rightarrow \{f_1, \ldots, f_n\}$) is processed to determine an impact indicator for a logo of a brand. In this manner, a logo-specific impact indicator can be provided. However, and as noted above, a brand can be associated with multiple logos. Consequently, and in some implementations, multiple logo-specific impact indicators can be determined, and can be combined to provide an overall, brand-specific impact indicator. For example, and continuing with an example above, a first logo-specific impact indicator can be determined for Nike, a second logo-specific impact indicator can be determined for the "swoosh" logo, and a third logo-specific impact indicator can be determined for a combined Nike and "swoosh" logo. In this manner, the respective impact of the individual logos, albeit of the same brand, can be determined. The multiple logo-specific indicators can be combined to determine a brand-specific indicator for Nike.

In some implementations, the frame set includes all frames recording the event. For example, for a soccer match that lasts 90 minutes, the frame set can include 9,720,000 frames (e.g., for video recorded at 30 frames-per-second (fps)).

In some implementations, the frame set includes only frames that include a particular logo and/or brand therein. Continuing with the example above, a first frame set can be provided that includes frames, in which Nike is depicted, a second frame set can be provided that includes frames, in which the "swoosh" logo is depicted, and a third frame set can be provided that includes frames, in which the combined Nike and "swoosh" logo is depicted. In this example, the first logo-specific impact indicator can be determined based on the first frame set, the second logo-specific impact indicator can be determined based on the second frame set, and the third logo-specific impact indicator can be determined based on the third frame set.

In some examples, a frame can be included in multiple frame sets. For example, and continuing with the above example, a frame depicts both Nike, and the "swoosh" logo, but does not depict the combined Nike and "swoosh" logo. Consequently, the frame is included in the first frame set, and the second frame set, but is not included in the third frame set.

In some implementations, each frame of all frames recording the event is processed using one or more computer-implemented analysis tools to identify any logo(s) in the frame, and, for each logo, a size, an area, a location, and a quality of the respective logo within the frame. An example platform providing computer-implemented analysis tools includes SAP Brand Intelligence provided by SAP SE of Walldorf, Germany. In some examples, each frame is processed to determine whether a logo is depicted in the frame, and, for each logo, a location, and a boundary are determined. In some examples, the boundary defines a size and area (e.g., in terms of pixels) that is attributed to the respective logo within the frame. In some examples, for each logo, the boundary determines a pixel set (e.g., $P \rightarrow \{p_1, \ldots, p_m\}$) of pixels that make up the logo within the frame. In some examples, the location of a logo is provided as a center of the boundary. For example, for each boundary, a center can be determined (e.g., a center pixel), and the location can be provided as the location of the center within the frame. In some examples, the location of the logo can be defined as the boundary itself.

Figure 2A:
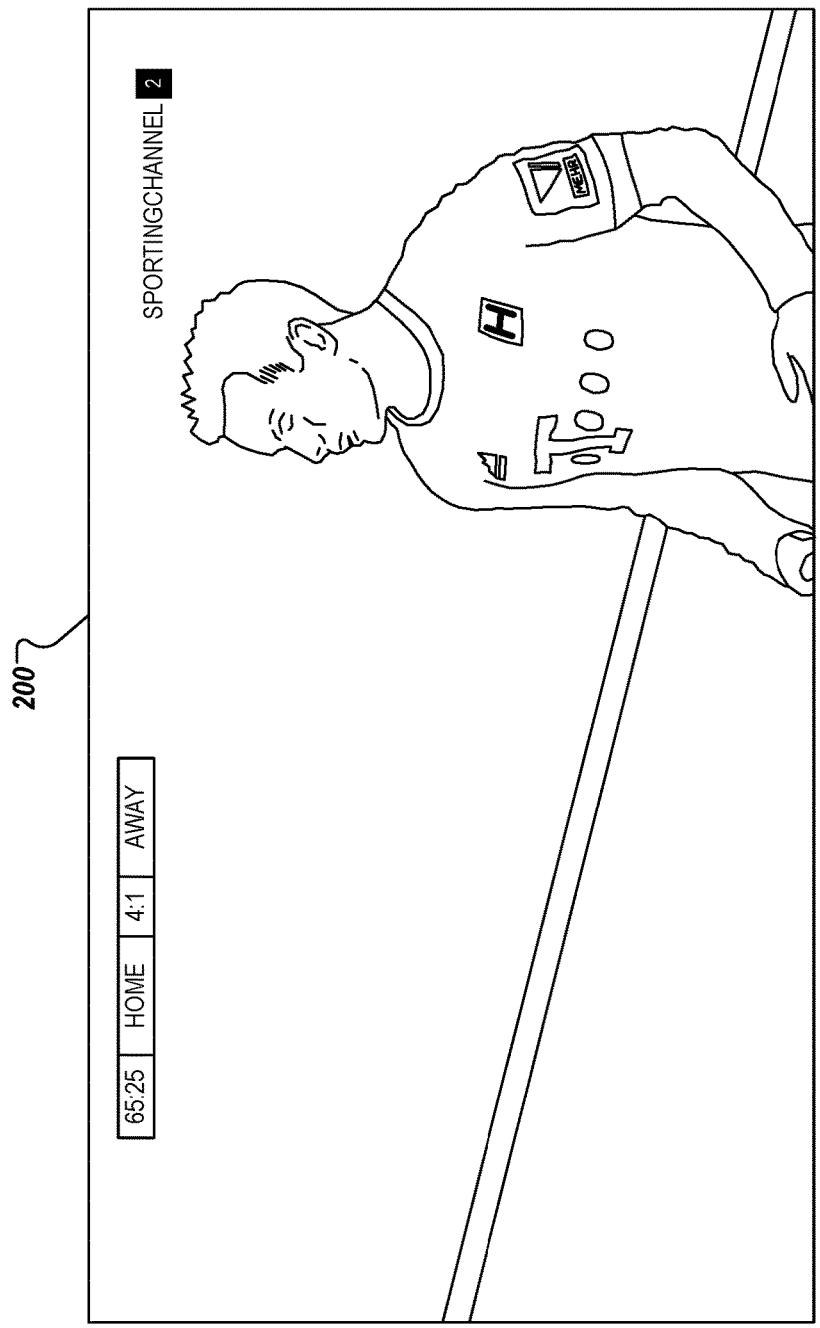
FIGS. 2A and 2B depict an example frame of an example event.
Figure 2B:
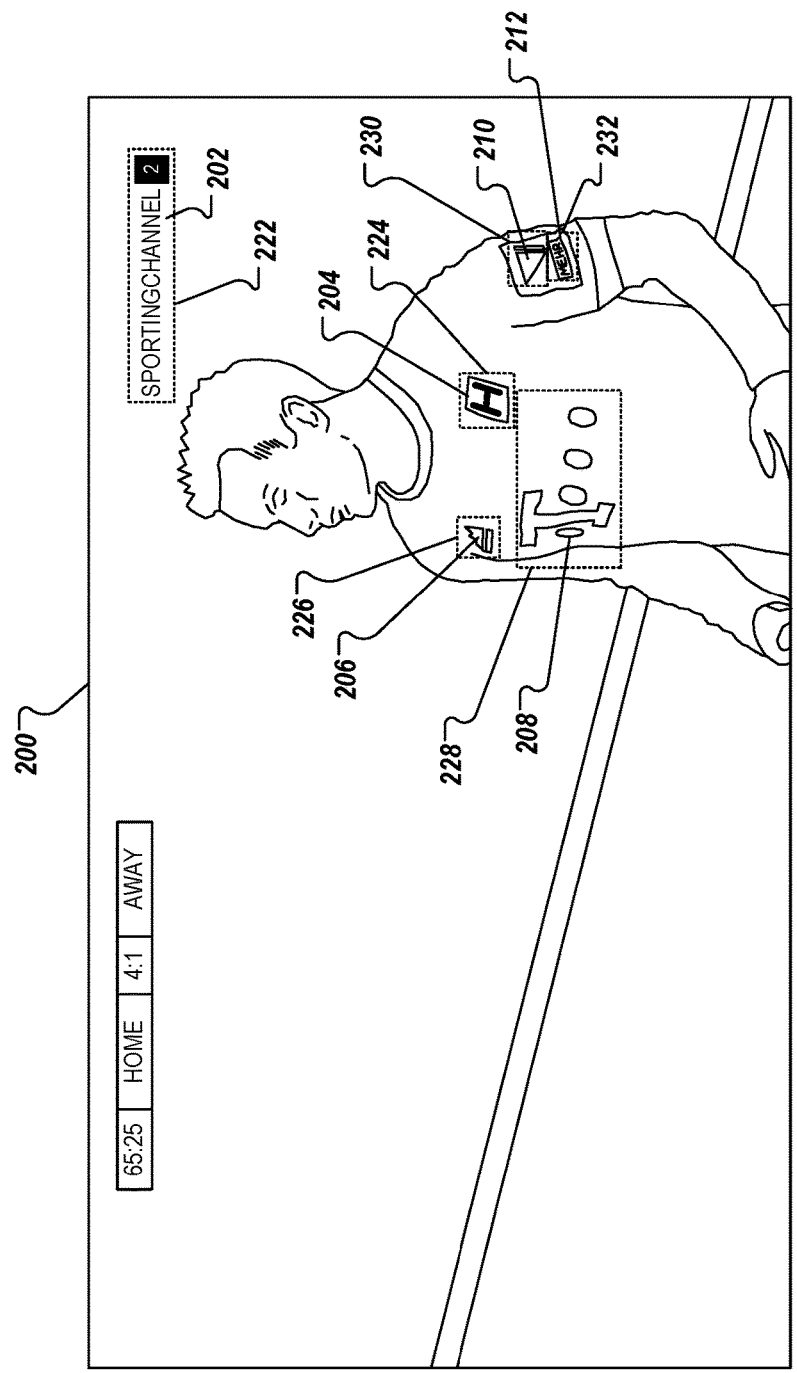

FIGS. 2A and 2B depict an example frame 200 of an example event (e.g., soccer match). In the example of FIG. 2A, the example frame 200 depicts a moment (e.g., 1/30$^{th}$ of a second) of the event, in this case, a lone player. The frame can be processed using the one or more computer-implemented analysis tools to identify logos depicted therein, and, for each logo, a location, and a boundary. FIG. 2B provides an example result of processing of the frame 200. In the depicted example, multiple logos 202, 204, 206, 208, 210, 212 are identified, and are bounded by respective boundaries 222, 224, 226, 228, 230, 232. For example, the logo 202 corresponds to a broadcaster that broadcasts the event, the logo 204 corresponds to the team that the player plays for, the logo 206 corresponds to an athletic clothing company that sponsors the team, the logo 208 corresponds to a commercial enterprise (e.g., a telecommunications company) that sponsors the team, the logo 212 corresponds to another commercial enterprise (e.g., a clothing retailer).

Although the boundaries 222, 224, 226, 228, 230, 232 are depicted as rectangles in FIG. 2B, it is contemplated that the boundaries can be provided as any appropriate shape (e.g., parallelogram, triangle, square, rectangle, pentagon, hexagon, octagon). In some examples, a boundary can have a customized shape. For example, a boundary can be provided as an outline of a respective logo as seen in the respective frame. Further, boundaries can have different shapes. For example, a first logo depicted in a frame can have a boundary with a first shape, and a second logo depicted in the frame can have a second shape that is different from the first shape.

In some examples, a set of metadata can be appended to each frame, the metadata indicating each, if any, logo(s) depicted in the frame, and, for each logo, the location, and boundary within the frame.

In some implementations, a quality of a logo within a frame can be determined. For example, a logo depicted in a frame can be processed to determine parameters such as, for example, contrast, clarity, sharpness, skew, and any other appropriate parameter that may indicate how well the logo is viewable within the frame. In some examples, a quality value (Q) can be provided for the respective logo based on one or more of the parameters. Using contrast as an example parameter, the quality can be determined based on one or more of an internal contrast (IC), and an external contrast (EC). For example, the quality can be equal to the internal contrast alone, the external contrast alone, or a combination of the internal contrast and the external contrast (e.g., sum, weighted sum, average).

In some examples, internal contrast can be determined based on the following example relationship, which includes example coefficients:

$$IC = 0.3 \cdot \sigma(r) + 0.6 \cdot \sigma(g) + 0.1 \cdot \sigma(y)$$

where r is the red channel [0-255], g is the green channel [0-255], and y is the yellow channel [0-255]. In some examples, external contrast can be determined based on the following example relationship, which includes example coefficients:

$$EC = 100 * \frac{(0.3 \cdot |\mu(lr) - \mu(br)| + 0.6 \cdot |\mu(lg) - \mu(bg)| + 0.1 \cdot |\mu(ly) - \mu(by)|)}{255}$$

where lr is the logo red channel [0-255], br is the background red channel [0-255], lg is the logo green channel [0-255], bg is the background green channel [0-255], ly is the logo yellow channel [0-255], and by is the background yellow channel [0-255].

In some implementations, the impact indicator can be determined based on the following example relationship:

$$I = \frac{\sum_f \left( \sum_p (W_p \times Q_p) \right) B_f}{T}$$

where $W_p$ is a weight of a logo appearing at position p, Q is the quality value provided for the logo, $B_f$ is a bias applied to a frame, and T is the total size of the recorded event. In some examples, T is determined as the product of the frame size, in pixels, and the number of frames. Using the example frame size above (2,073,600 pixels), and the example number of frames above (9,720,000 frames), an example value for T is $2.015 \times 10^{13}$.

In some implementations, the weight of the pixel is determined by the importance of the pixel location within the frame. For example, research has determined that viewers tend to look at the center of the screen, if for example, no other indication for a center of interest exists within the frame. In such an example, weights for pixels within the frame can be provided using a bivariate normal distribution over the frame and setting the weight for each pixel to its probability. Accordingly, a normalized value [0-1] can be provided with the sum of all weights equal to 1. In another example, a frame can include multiple centers of attention based on the content of the frame (e.g., a frame depicting the ball, and the intended player; a frame depicting multiple cars in a car race; a frame depicting both players in a tennis match). In such examples, a multimodal distribution can be used to determine the weights in a similar manner as with the bivariate normal distribution discussed above.

In some implementations, each frame that is to be considered can be processed to determine whether the frame includes a single center of interest, or whether the frame includes multiple centers of interest. For frames that include a single center of interest, the bivariate normal distribution can be used to determine the pixel weights for each frame. For frames that include multiple centers of interest, the multimodal distribution can be used to determine the pixel weights for each frame.

In some implementations, the bias applied to a frame corresponds to a relative relevance of the action depicted in the frame. For example, a time-stamped list of occurrences during the event can be provided, and the bias can be determined based on the relevance of the occurrence. For example, a goal being scored is an occurrence with relatively high relevance, as compared to a time out, where players may be standing about. The time-stamped list can relate occurrences to the digital media, and respective frames, such that a bias value can be determined for each frame. An example time-stamped list is provided as:

| Minute | Event | Bias |
|---|---|---|
| 90' | Full-Time | 1 |
| 89' | Yellow card for Aymane Barkok (Eintracht Frankfurt) | 1.2 |
| 88' | Substitution (in) Max Besuschkow (Eintracht Frankfurt) | 1.4 |
| 85' | Substitution (in) Aymane Barkok (Eintracht Frankfurt) | 1.4 |
| 83' | Goal Eintracht Frankfurt, Ante Rebi? (left-footed shot) | 2 |
| 82' | Yellow card for Mijat Ga?inovi? (Eintracht Frankfurt) | 1.2 |

-continued

| Minute | Event | Bias |
|---|---|---|
| 79' | Substitution (in) Hamit Altintop (SV Darmstadt 98) | 1.4 |
| 78' | Yellow card for Ayta? Sulu (SV Darmstadt 98) | 1.2 |
| 75' | Substitution (in) Shani Tarashaj (Eintracht Frankfurt) | 1.4 |
| 74' | Goal Eintracht Frankfurt, Makoto Hasebe (penalty) | 2 |
| 73' | Yellow card for Alexander Milo?evi? (SV Darmstadt 98) | 1.2 |
| 68' | Substitution (in) Antonio ?olak (SV Darmstadt 98) | 1.4 |
| 62' | Substitution (in) Sandro Sirigu (SV Darmstadt 98) | 1.4 |
| 46' | Second Half begins | 0.8 |
| 45' | Half-Time | 0.8 |
| 36' | Yellow card for Peter Niemeyer (SV Darmstadt 98) | 1.4 |

In the example time-stamped list of events, goals are assigned the highest bias value, as they can be considered the most relevant occurrence during the event (soccer match).

Figure 3:
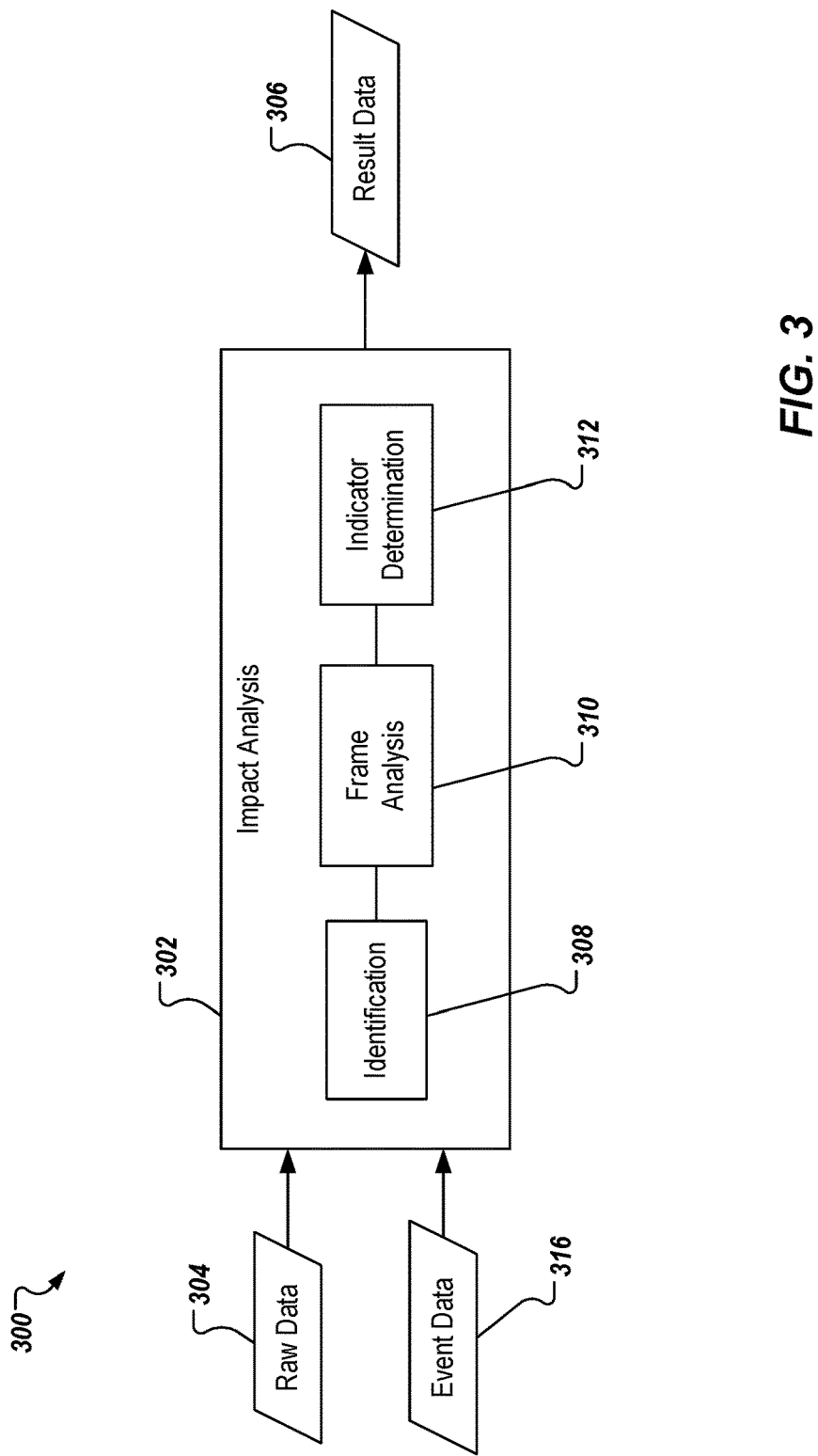
FIG. 3 depicts an example conceptual architecture in accordance with implementations of the present disclosure.

FIG. 3 depicts an example conceptual architecture 300 in accordance with implementations of the present disclosure. In the depicted example, the architecture 300 includes an impact analysis module 302 that receives raw date 304 to provide results data 306. Further, the example architecture 300 includes an identification sub-module 308, a frame analysis sub-module 310, and an indicator determination sub-module 312. In the depicted example, the impact analysis module 302 can receive event data 316 that can be used to provide the results data 306, as described herein.

In some examples, the raw data 304 includes digital media, such as digital video, which includes frames that record an event (e.g., soccer match). In some examples, the result data 306 includes one or more impact indicators. For example, an impact indicator can be determined for each of one or more brands displayed during the event, as described herein.

In some implementations, the identification sub-module 308 processes the raw data 304 to identify one or more logos within frames of the raw data 304. For example, if a particular logo is to be reviewed, the identification sub-module 308 processes the raw data to provide a set of frames, each frame in the set of frames depicting the logo. In some implementations, the frame analysis sub-module 310 processes frames in the set of frames to determine, for example, a quality for the logo depicted in the frame, a location/size of the logo, and for example, any bias that is to be applied to the frame. For example, the event data 316 can provide information regarding occurrences during the event, and a bias value associated with each occurrence (e.g., see the example time-stamped list, and associated description above). In some examples, the frame analysis sub-module 310 can associate frames with respective biases. In some implementations, the indicator determination sub-module 312 determines an indicator for each logo, as described herein. In some examples, the result data 306 includes the indicator determined for the logo.

Figure 4:
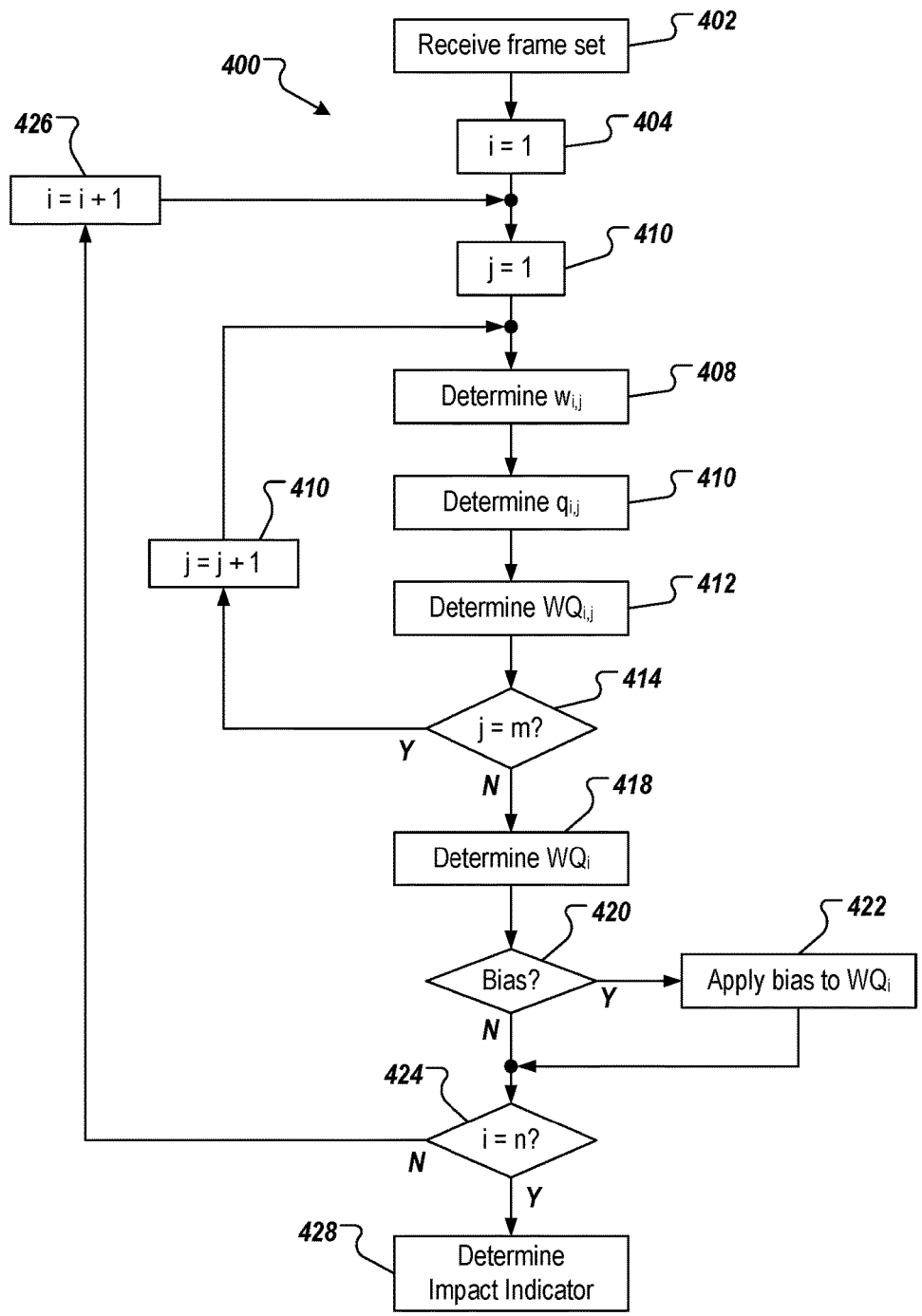
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices. In some implementations, the example process 400 is performed for each logo identified in a recorded event.

A frame set is received (402). In some examples, the frame set includes F→{$f_1$, ..., $f_n$}, the frames digitally recording an event. Each frame can be provided as a digital image. In some examples, the frame set records one or more events. In some examples, the frame set records a portion of an event. In some implementations, the frame set only includes frames that include the logo, for which the example process 400 is being performed. A counter i is set equal to 1 (404). A counter j is set equal to 1 (406).

A weight $w_{i,j}$ is determined (408). In some examples, the weight $w_{i,j}$ is a weight value assigned to the $j^{th}$ pixel ($p_j$) of the logo identified in the $i^{th}$ frame ($f_i$). For example, a pixel set P→{$p_1$, ..., $p_m$} can be provided, which includes the pixels that make-up the logo within the $i^{th}$ frame ($f_i$). In some examples, the weight $w_{i,j}$ is determined based on a location of the pixel within the frame, as described herein. A quality $q_{i,j}$ is determined (410). In some examples, the quality $q_{i,j}$ is provided for a logo that at least partially occupies the pixel. In some examples, and as described herein, the quality is based on one or more of the parameters (e.g., one or more of an internal contrast (IC), and an external contrast (EC)). A quotient $WQ_{i,j}$ of the weight and the quality is determined (412). It is determined whether the counter j is equal to m (414). If the counter j is not equal to m, all pixels of the frame $f_i$ have not been considered. Accordingly, the counter j is incremented (410), and the example process 400 loops back to consider the next pixel.

If the counter j is equal to m, all pixels of the frame $f_i$ have been considered, and an overall quotient $WQ_i$ of the weight and the quality of all pixels of the frame $f_i$ is determined (412). For example, all of the quotients $WQ_{i,j}$ of all pixels are summed. It is determined whether a bias is to be applied to the frame $f_i$ (420). If a bias is to be applied, the bias is applied to the overall quotient $WQ_i$ (422). For example, and as described above (e.g., with reference to the example time-stamped list), frames depicting relatively more significant events can be positively biased (e.g., multiplied by a bias value that is greater than one), and/or frames depicting relatively less significant events can be negatively biased (e.g., multiplied by a bias value that is less than one).

It is determined whether the counter i is equal to n (424). If the counter i is not equal to n, all frames of the set of frames have not been considered. Accordingly, the counter i is incremented (426), and the example process 400 loops back to consider the next pixel. If the counter i is not equal to n, all frames of the set of frames have been considered, and an impact indicator is determined for the logo being considered (428). In some examples, the impact indicator is determined as the sum of all of the overall quotients determined for all frames in the set of frames (with any biases applied) divided by the total size T of the recorded event.

Implementations of the present disclosure provide one or more of the following example advantages. Implementations of the present disclosure increase the efficiency of review of digital media, which can include millions of frames, for evaluating brand impact in events. Further, implementations of the present disclosure can provide metrics for brand impact evaluation from digital media in near-realtime. For example, the brand impact metrics can be provided in (significantly) less time than the duration of the digital media. In this manner, computing resources that would otherwise be required to, at a minimum, view the entirety of the digital media, are conserved. Further, implementations of the present disclosure enable features, such as area, and quality, to be considered in determining the brand impact.

Figure 5:
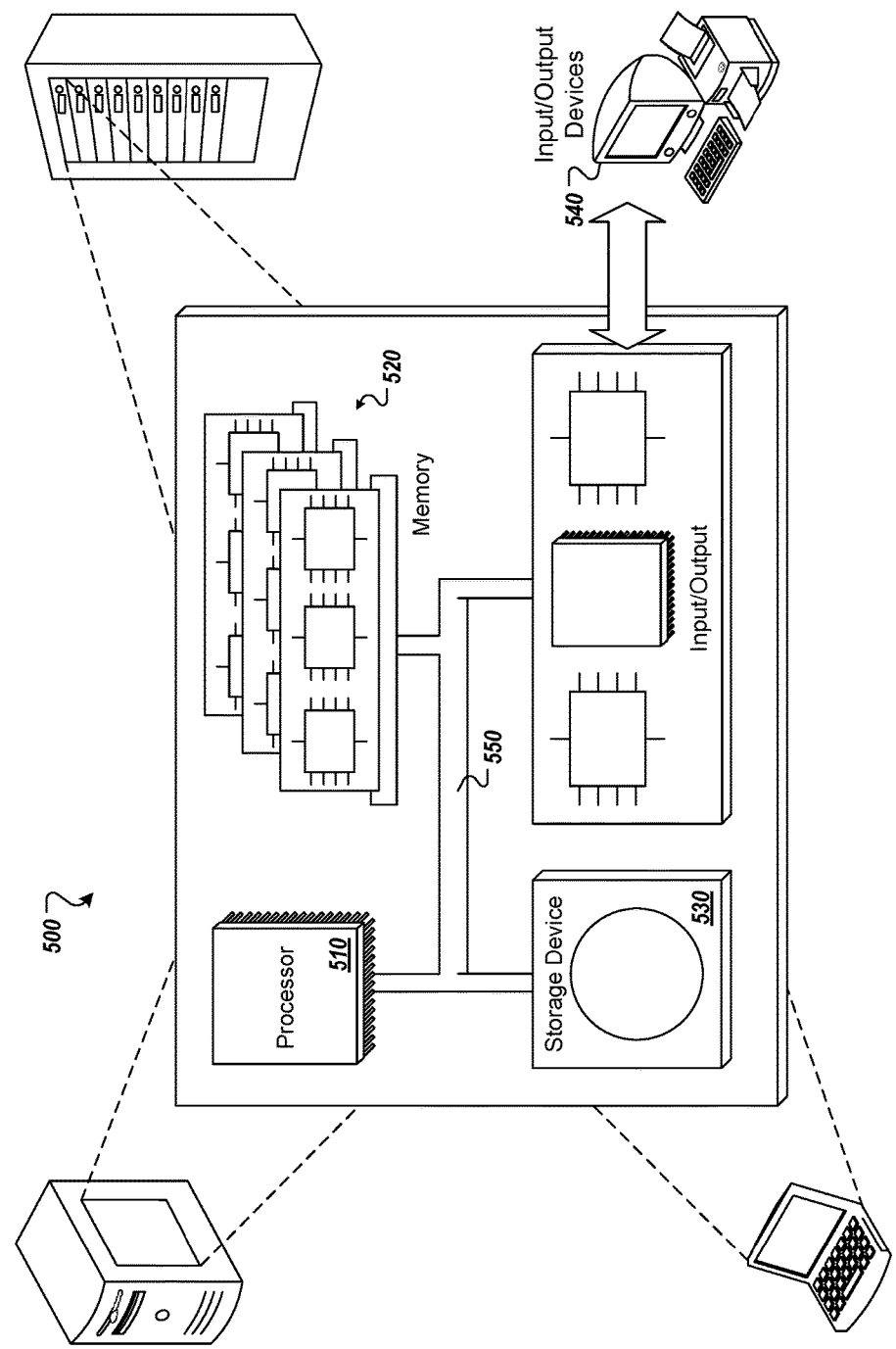
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for evaluating an impact of a brand intermittently represented in digital media, the method being executed by one or more processors and comprising:
   receiving, by the one or more processors, a set of frames, each frame being provided as a digital image that depicts a portion of an event and a logo associated with a brand;
   for each frame in the set of frames, and for each pixel in a frame:
      determining, by the one or more processors, a weight of the pixel based on a distribution assigned to the frame,
      providing, by the one or more processors, a quality of the logo depicted in the frame, and
      calculating, by the one or more processors, a pixel quotient based on the weight and the quality;
   for each frame in the set of frames:
      determining, by the one or more processors, a frame quotient at least partially based on a sum of all pixel quotients for the frame; and
   determining, by the one or more processors, an impact indicator for the logo based on a total size of digital media comprising the set of frames and a sum of frame quotients of the frames in the set of frames.

2. The method of claim 1, wherein the frame quotient for at least one frame is further determined based on a bias value applied to the frame quotient, the bias value indicating a relative significance of an occurrence at least partially depicted within the at least one frame.

3. The method of claim 1, wherein the distribution comprises one of a bivariate normal distribution, and a multimodal distribution.

4. The method of claim 1, wherein a first frame is assigned a bivariate normal distribution, and a second frame is assigned a multimodal distribution.

5. The method of claim 1, wherein the quality is determined based on one or more of an internal contrast of the logo, and an external contrast of the logo.

6. The method of claim 1, wherein the total size of digital media is determined based on the number of pixels of all frames that record the event.

7. The method of claim 1, further comprising determining a brand impact value based on a plurality of impact indicators, the plurality of impact indicators comprising the impact indicator for the logo.

8. A non-transitory computer-readable storage medium coupled to one or more processors and having instructions stored thereon which, when executed by the one or more processors, cause the one or more processors to perform operations for evaluating an impact of a brand intermittently represented in digital media, the operations comprising:
   receiving a set of frames, each frame being provided as a digital image that depicts a portion of an event and a logo associated with a brand;
   for each frame in the set of frames, and for each pixel in a frame:
      determining a weight of the pixel based on a distribution assigned to the frame,
      providing a quality of the logo depicted in the frame, and
      calculating a pixel quotient based on the weight and the quality;
   for each frame in the set of frames:
      determining a frame quotient at least partially based on a sum of all pixel quotients for the frame; and
   determining an impact indicator for the logo based on a total size of digital media comprising the set of frames and a sum of frame quotients of the frames in the set of frames.

9. The computer-readable storage medium of claim 8, wherein the frame quotient for at least one frame is further determined based on a bias value applied to the frame quotient, the bias value indicating a relative significance of an occurrence at least partially depicted within the at least one frame.

10. The computer-readable storage medium of claim 8, wherein the distribution comprises one of a bivariate normal distribution, and a multimodal distribution.

11. The computer-readable storage medium of claim 8, wherein a first frame is assigned a bivariate normal distribution, and a second frame is assigned a multimodal distribution.

12. The computer-readable storage medium of claim 8, wherein the quality is determined based on one or more of an internal contrast of the logo, and an external contrast of the logo.

13. The computer-readable storage medium of claim 8, wherein the total size of digital media is determined based on the number of pixels of all frames that record the event.

14. The computer-readable storage medium of claim 8, wherein operations further comprise determining a brand impact value based on a plurality of impact indicators, the plurality of impact indicators comprising the impact indicator for the logo.

15. A system, comprising:
   a computing device; and
   a computer-readable storage device coupled to the computing device and having instructions stored thereon which, when executed by the computing device, cause the computing device to perform operations for evaluating an impact of a brand intermittently represented in digital media, the operations comprising:
   receiving a set of frames, each frame being provided as a digital image that depicts a portion of an event and a logo associated with a brand;
   for each frame in the set of frames, and for each pixel in a frame:
      determining a weight of the pixel based on a distribution assigned to the frame,
      providing a quality of the logo depicted in the frame, and
      calculating a pixel quotient based on the weight and the quality;
   for each frame in the set of frames:
      determining a frame quotient at least partially based on a sum of all pixel quotients for the frame; and
   determining an impact indicator for the logo based on a total size of digital media comprising the set of frames and a sum of frame quotients of the frames in the set of frames.

16. The system of claim 15, wherein the frame quotient for at least one frame is further determined based on a bias value applied to the frame quotient, the bias value indicating a relative significance of an occurrence at least partially depicted within the at least one frame.

17. The system of claim 15, wherein the distribution comprises one of a bivariate normal distribution, and a multimodal distribution.

18. The system of claim 15, wherein a first frame is assigned a bivariate normal distribution, and a second frame is assigned a multimodal distribution.

19. The system of claim 15, wherein the quality is determined based on one or more of an internal contrast of the logo, and an external contrast of the logo.

20. The system of claim 15, wherein the total size of digital media is determined based on the number of pixels of all frames that record the event.

* * * * *